United States Patent
Seidel et al.

(10) Patent No.: US 10,655,011 B2
(45) Date of Patent: May 19, 2020

(54) ANTISTATIC AND LIGHT-STABLE THERMOPLASTIC POLYCARBONATE MOULDING COMPOUNDS

(71) Applicant: Covestro Deutschland AG, Leverkusen (DE)

(72) Inventors: Andreas Seidel, Dormagen (DE); Kristina Pupovac, Düsseldorf (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/096,945

(22) PCT Filed: Apr. 25, 2017

(86) PCT No.: PCT/EP2017/059745
§ 371 (c)(1),
(2) Date: Oct. 26, 2018

(87) PCT Pub. No.: WO2017/186690
PCT Pub. Date: Nov. 2, 2017

(65) Prior Publication Data
US 2019/0119491 A1    Apr. 25, 2019

(30) Foreign Application Priority Data

Apr. 27, 2016 (EP) .................................. 16167314

(51) Int. Cl.
| | |
|---|---|
| *C08L 69/00* | (2006.01) |
| *C08L 77/12* | (2006.01) |
| *C08L 55/02* | (2006.01) |
| *C08K 5/55* | (2006.01) |
| *C08L 67/03* | (2006.01) |
| *C08K 3/22* | (2006.01) |

(Continued)

(52) U.S. Cl.
CPC .............. *C08L 69/00* (2013.01); *C08K 3/22* (2013.01); *C08K 5/55* (2013.01); *C08L 55/02* (2013.01); *C08L 67/02* (2013.01); *C08L 67/03* (2013.01); *C08L 69/005* (2013.01); *C08L 75/08* (2013.01); *C08L 77/12* (2013.01); *B29C 45/0001* (2013.01); *B29K 2069/00* (2013.01); *B29K 2995/0055* (2013.01); *C08L 2201/08* (2013.01); *C08L 2205/03* (2013.01)

(58) Field of Classification Search
None
See application file for complete search history.

(56) References Cited

U.S. PATENT DOCUMENTS

| | | |
|---|---|---|
| 3,419,634 A | 12/1968 | Vaughn, Jr. |
| 3,553,167 A | 1/1971 | Schnell et al. |

(Continued)

FOREIGN PATENT DOCUMENTS

| | | |
|---|---|---|
| CA | 1173998 A | 9/1984 |
| CN | 101759974 A | 6/2010 |

(Continued)

OTHER PUBLICATIONS

International Preliminary Report on Patentability for International Application No. PCT/EP2017/059745, dated Nov. 8, 2018.

(Continued)

*Primary Examiner* — Robert T Butcher
(74) *Attorney, Agent, or Firm* — Faegre Drinker LLP

(57) ABSTRACT

The invention relates to compositions comprising
A) 50% to 90% by weight of at least one polymer selected from the group consisting of aromatic polycarbonate, aromatic polyestercarbonate and aromatic polyester,
B) 5% to 40% by weight of polymer containing
  B.1 at least one rubber-modified vinyl (co)polymer containing
    B.1.1 80% to 95% by weight, based on B.1, of at least one vinyl monomer and
    B.1.2 5% to 20% by weight, based on B.1, of one or more elastomeric polybutadiene-containing graft bases,
  where B.1 contains
    polybutadiene-containing rubber particles which have been grafted with the vinyl monomers B.1.1 and contain inclusions of vinyl (co)polymer consisting of the vinyl monomers B.1.1, and
    a vinyl (co)polymer matrix consisting of the vinyl monomers B.1.1 which is not bound to these rubber particles and is not included in rubber particles,
  and optionally B.2 further rubber particles grafted with vinyl monomers and composed of
    B.2.1 5% to 75% by weight, based on B.2, of at least one vinyl monomer and
    B.2.2 25% to 95% by weight, based on B.2, of one or more elastomeric graft bases,
C) 3% to 25% by weight of a mixture comprising a) at least one polyether-based polymer or copolymer selected from the group consisting of polyether block polymers and polyether-based polyurethanes and b) at least one boron-containing salt,
D) 0% to 2% by weight of at least one UV stabilizer selected from the group consisting of the substance classes of the benzotriazoles and triazines,
E) 0% to 20% by weight of one or more further additives,
wherein the compositions comprising components A) to E) have a polybutadiene content of 1% to 5% by weight,
and to the use of the compositions for the production of moulded articles, and to the moulded articles themselves.

21 Claims, No Drawings

(51) Int. Cl.
*C08L 67/02* (2006.01)
*C08L 75/08* (2006.01)
*B29C 45/00* (2006.01)
*B29K 69/00* (2006.01)

(56) References Cited

U.S. PATENT DOCUMENTS

| | | |
|---|---|---|
| 3,644,574 A | 2/1972 | Jackson, Jr. et al. |
| 3,692,744 A | 9/1972 | Rich et al. |
| 4,013,613 A | 3/1977 | Abolins et al. |
| 4,075,173 A | 2/1978 | Maruyama et al. |
| 4,156,069 A | 5/1979 | Prevorsek et al. |
| 4,176,224 A | 11/1979 | Bier et al. |
| 4,269,964 A | 5/1981 | Freitag et al. |
| 4,311,823 A | 1/1982 | Imai et al. |
| 4,334,053 A | 6/1982 | Freitag et al. |
| 4,584,360 A | 4/1986 | Paul et al. |
| 4,731,405 A | 3/1988 | Kirsch et al. |
| 4,871,804 A | 10/1989 | Murabayashi |
| 4,937,285 A | 6/1990 | Wittmann et al. |
| 6,706,851 B1 | 3/2004 | Linemann et al. |
| 6,784,257 B2 | 8/2004 | Hilgers et al. |
| 6,913,804 B2 | 7/2005 | Lacroix et al. |
| 8,455,581 B2 | 6/2013 | Feldermann et al. |
| 2012/0165442 A1* | 6/2012 | Feldermann ............ C08L 67/02 524/117 |
| 2014/0227542 A1* | 8/2014 | Hillberg ................. C08K 5/55 428/474.7 |
| 2015/0011689 A1* | 1/2015 | Erkelenz ............. C08K 5/0066 524/165 |

FOREIGN PATENT DOCUMENTS

| | | |
|---|---|---|
| CN | 101967274 A | 2/2011 |
| CN | 104830043 A | 8/2015 |
| DE | 1900270 A1 | 11/1969 |
| DE | 2035390 A1 | 1/1971 |
| DE | 1495626 B1 | 6/1971 |
| DE | 2248242 A1 | 4/1973 |
| DE | 2232877 A1 | 1/1974 |
| DE | 2407674 A1 | 10/1974 |
| DE | 2407776 A1 | 9/1975 |
| DE | 2703376 A1 | 8/1977 |
| DE | 2714544 A1 | 10/1977 |
| DE | 2715932 A1 | 10/1978 |
| DE | 2842005 A1 | 4/1980 |
| DE | 3000610 A1 | 7/1980 |
| DE | 2940024 A1 | 4/1981 |
| DE | 3007934 A1 | 9/1981 |
| DE | 3334782 A1 | 10/1984 |
| DE | 3544295 A1 | 6/1987 |
| DE | 3832396 A1 | 2/1990 |
| EP | 613919 A1 | 9/1994 |
| EP | 730005 A2 | 9/1996 |
| EP | 1046675 A1 | 10/2000 |
| EP | 1155065 A1 | 11/2001 |
| EP | 1262527 A2 | 12/2002 |
| GB | 1464449 A | 2/1977 |
| JP | H09137053 B2 | 5/1997 |
| JP | H10101921 B2 | 4/1998 |
| WO | WO-0129113 A1 | 4/2001 |
| WO | WO-2012084848 A1 | 6/2012 |
| WO | WO-2013001168 A1 | 1/2013 |

OTHER PUBLICATIONS

International Search Report for PCT/EP2017/059706 dated Jun. 21, 2017.
International Search Report for PCT/EP2017/059745 dated Jun. 21, 2017.
Written Opinion of the International Searching Authority for PCT/EP2017/059706 dated Jun. 21, 2017.
Written Opinion of the International Searching Authority for PCT/EP2017/059745 dated Jun. 21, 2017.

* cited by examiner

ANTISTATIC AND LIGHT-STABLE THERMOPLASTIC POLYCARBONATE MOULDING COMPOUNDS

CROSS-REFERENCE TO RELATED APPLICATIONS

This application is a national stage application (under 35 U.S.C. § 371) of PCT/EP2017/059745, filed Apr. 25, 2017, which claims benefit of European Application No. 16167314.0, filed Apr. 27, 2016, both of which are incorporated herein by reference in their entirety.

The present invention relates to light-stable moulding compounds that have been rendered permanently antistatic and have low-temperature toughness and to compositions thereof comprising at least one polymer selected from the group consisting of aromatic polycarbonate, aromatic polyestercarbonate and aromatic polyester, to the use of the moulding compounds for production of moulded articles and to the moulded articles themselves.

BACKGROUND OF THE INVENTION

The accumulation of dust resulting from electrostatic charging with formation of dust patterns is a widespread problem with moulded plastics articles. Dust deposits on high-gloss moulded articles are particularly troublesome and functionally limiting. A further problem with many moulded plastics articles is the change in intrinsic colour under the influence of ageing processes. More particularly many plastics have a tendency to yellow, for example, under the influence of (UV) light.

The abovementioned problems are often solved by application of an antistatic and light-stable coating (for example by painting). Examples of relevant fields of application include housings applications in information technology and decorative automotive interior components. Especially in the latter field of application a high material ductility even at low temperatures is generally a further component requirement.

If a downstream coating process is to be eschewed the moulding compounds must naturally not only possess the desired mechanical properties but must moreover also possess the required surface properties (high dissipative electrical conductivity/low specific electrical surface resistance and good light stability), However, the desired combination of ductility even at low temperatures, high dissipative electrical conductivity and good light stability is often not sufficiently realized by thermoplastic compositions of the prior art.

Polycarbonate compositions are often employed in the recited fields of application because of their advantageous combination of properties including good processability (high melt flowability), exceptional mechanical properties, high heat resistance and flame retardancy. However, a technical challenge which has still not yet been resolved adequately for many fields of use of such polycarbonate compositions is still the combined implementation of ductile material characteristics even at low temperatures, good ageing stability, especially adequate lightfastness, and good colourability, as required for many uncoated components. Commercial compositions comprising polybutadiene rubber-based impact modifiers, for example polycarbonate/ ABS blends, do have good low-temperature toughness and colourability, but generally have inadequate light stability. Compositions comprising acrylate rubber-based impact modifiers, for example is polycarbonate/ASA blends, by contrast, are light-stable and, in the case of selection of suitable impact modifier types, are sometimes also sufficiently colourable, but have inadequate low-temperature ductility. Compositions comprising silicone rubber- or silicone-acrylate composite rubber-based impact modifiers in turn do have adequate light stability and low-temperature toughness, but have inadequate colouring characteristics. Moreover, although polycarbonate compositions that have been rendered permanently antistatic are basically known, the addition of the additives required for this purpose generally has a disadvantageous effect on the properties desired.

In this respect, another unresolved technical challenge is that of providing polycarbonate compositions that are simultaneously sufficiently permanently antistatic, light-stable, tough at low temperatures and colourable—especially when the application additionally also requires good processibility and processing stability and also high heat resistance, properties that are generally expected from commercial polycarbonate compositions but often cannot be achieved easily.

The literature describes antistats for thermoplastics (see for example Gächter, Müller, Plastic Additives, Hanser Verlag, Munich, 1996, p. 749 ff) which reduce dust accumulation. These antistats reduce the electric surface resistivity of the plastics moulding compounds, resulting in better discharge of surface charges which form during production and through friction during use. Dust particles are thus electrostatically attracted to a lesser extent.

Polyetheramides, polyesteramides or polyetheresteramides are commonly described antistats, and these compounds are capable of rendering polymer compositions permanently antistatic. Their effect is based on the formation of a three-dimensional network of the antistat in the antistat-immiscible polymer to be rendered antistatic. On account of the comparatively high electrical conductivity of polyetheramides, polyesteramides and polyetheresteramides, this results in an instant and permanent reduction in the electrical surface and volume resistivity of the polymer to be rendered antistatic, which sets in even at very low air humidities and is far less dependent thereon than is the case for the surface-active compounds such as salts of long-chain sulphonic acids likewise recited in the literature.

Polycarbonate compositions that have been rendered permanently antistatic are disclosed, for example, in U.S. Pat. No. 6,784,257 B2. This application describes antistatic polymer compositions comprising a thermoplastic polymer and a polyether-polyamide block copolymer having a melting point between 80° C. and 150° C., wherein the polyether blocks comprise ethylene oxide units.

U.S. Pat. No. 6,706,851 B1 discloses antistatic polymer compositions comprising a thermoplastic polymer and a polyetheresteramide block copolymer, wherein the polyether blocks consist essentially of ethylene oxide units.

U.S. Pat. No. 6,913,804 B2 discloses antistatic polymer compositions comprising a thermoplastic polymer and a mixture of a copolymer which comprises polyamide and polyether blocks and does not comprise any ionically functional groups and a copolymer comprising polyamide and polyether blocks which does comprise ionically functional groups.

All three of the abovementioned patents also disclose compositions in which the thermoplastic polymer is polycarbonate, ABS or a mixture thereof.

CN 101967274 A discloses permanently antistatic polycarbonate/acrylonitrile-butadiene-styrene (PC/ABS) compositions having excellent mechanical properties and weathering resistance comprising polycarbonate, an ABS resin, antistatic agents, compatibilizers, antioxidants, light stabilizers and other additives. Antistatic agents disclosed include polyetheresters, polyetheresteramides and polyetheramides.

CN 101759974 A discloses antistatic polycarbonate compositions having low odour and high toughness for automotive interior applications comprising polycarbonates, ABS resin produced in a bulk polymerization process and having a melt flow index of 4 to 25 g/10 min, a polymeric antistatic agent, a compatibilizer and optionally further additives selected from for example the group comprising colourants, fillers, stabilizers and lubricants. Antistatic agents disclosed include polyetheramides.

JP 3663701 B2 discloses antistatic polycarbonate compositions comprising polycarbonate, rubber-modified thermoplastic comprising vinyl polymer and graft polymer obtained by grafting vinyl monomers onto rubber-like polymers and polyetheramides.

JP 3611228 B2 discloses antistatic polycarbonate compositions comprising polycarbonate, rubber-modified vinyl/cyanovinyl copolymers, polyetheresteramide block copolymers and metal salt.

WO 2012/084848 A1 discloses antistatic polycarbonate moulding compounds having improved heat resistance, low-temperature toughness, processing stability, stress fracture resistance and hydrolysis resistance comprising polycarbonate, rubber-modified vinyl (co)polymer, a compound selected from the group consisting of polyetheramides, polyesteramides and polyetheresteramides, a specific Brønsted acid and optionally further additives. There is no disclosure of boron salt-containing antistatic agents.

CN 104830043 A discloses antistatic polycarbonate/acrylonitrile-styrene-acrylate (PC/ASA) compositions for decorative automobile interior components, comprising polycarbonate, an ASA resin, impact modifiers, antioxidants, light stabilizers, lubricants, antistatic agents and chain extenders, which feature a reduced tendency to attract dust and well-balanced stiffness and ductility and are light-resistant.

WO 2013/001168 A1 discloses ion-conductive halogen-free polymer blends comprising at least one polyether-based polymer or copolymer selected from the group of the polyether block polymers and polyether-based polyurethanes, characterized in that this blend comprises an alkali metal salt of a boron-centred anionic complex containing bidentate ligands selected from the group consisting of C2-C8 aliphatic or aromatic components having at least two reactive groups selected from —COOH and —OH, where the boron-containing salt in a preferred embodiment is potassium bis(oxalato)borate or sodium bis(oxalato)borate. The application likewise discloses ion-conductive polymer blends also comprising a polymeric material selected from the group consisting of polyamides, polyesters, polyacrylates, polymethylmethacrylates and polyester-based polyurethanes. There is no disclosure of polycarbonate-based blends.

It was desirable to provide permanently antistatic compositions comprising at least one representative selected from the group consisting of aromatic polycarbonate, aromatic polyestercarbonate and aromatic polyester having an improved combination of lowest possible specific electrical surface resistance (sufficiently high dissipative electrical conductivity), excellent colour stability under exposure to heat and light, and low-temperature ductility. The compositions were additionally to have good processability and processing stability, and also high heat resistance. The compositions were accordingly to fulfil the requirements of the automotive industry for unpainted decorative components in automotive interiors. In addition, the moulding compounds were to have good colourability and, in the coloured state, were to meet the Volkswagen specifications according to PV3977 on dissipative electrical conductivity (experience shows that this requires a specific surface resistance of not more than $1 \cdot 10^{12} \Omega$) and according to PV1303 on resistance to heat and light, and have substantially ductile characteristics at −30° C. both in the multiaxial puncture experiment and in the notched impact experiment. In the heat-and-light ageing according to PV1303, the target is a greyscale assessment relative to the starting state prior to exposure of not less than 4 for an exposure period of 3 exposure cycles, preferably even for an exposure period of up to 6 exposure cycles.

BRIEF SUMMARY OF THE INVENTION

It has now been found that compositions comprising
A) 50% to 90% by weight, preferably 60% to 80% by weight and more preferably 65% to 75% by weight of at least one polymer selected from the group consisting of aromatic polycarbonate, aromatic polyestercarbonate and aromatic polyester, preferably aromatic polycarbonate,
B) 5% to 40% by weight, preferably 10% to 30% by weight and more preferably 15% to 25% by weight of polymer containing
   B.1 at least one rubber-modified vinyl (co)polymer containing
      B.1.1 80% to 95% by weight, based on B.1, of at least one vinyl monomer and
      B.1.2 5% to 20% by weight, based on B.1, of one or more elastomeric polybutadiene-containing graft bases,
   where B.1 contains
      polybutadiene-containing rubber particles which have been grafted with the vinyl monomers B.1.1 and containing inclusions of vinyl (co)polymer consisting of the vinyl monomers B.1.1, and
      a vinyl (co)poly matrix consisting of the vinyl monomers B.1.1 which is not bound to these rubber particles and is not included in rubber particles,
   and optionally B.2 further rubber particles grafted with vinyl monomers, preferably produced in an emulsion polymerization method, and composed of
      B.2.1 5% to 75% by weight, preferably 10% to 60% by weight and more preferably 25% to 50% by weight, based in each case on B.2, of at least one vinyl monomer,
      B.2.2 25% to 95% by weight, preferably 40% to 90% by weight and more preferably from 50% to 75% by weight, based in each case on B.2, of one or
C) 3% to 25% by weight, preferably 5% to 15% by weight and more preferably 6% to 12% by weight of a mixture comprising a) at least one polyether-based polymer or copolymer selected from the group consisting of polyether block polymers and polyether-based polyurethanes and b) at least one boron-containing salt,
D) 0% to 2% by weight, preferably 0.1% to 1.0% by weight and more preferably 0,2% to 0.8% by weight of at least one UV stabilizer selected from the group consisting of the substance classes of the benzotriazoles and triazines,
E) 0% to 20% by weight, preferably 0.1% to 10% by weight and more preferably 0.2% to 5% by weight of one or more further additives, where the compositions comprising components A) to E) have a polybutadiene content of 1% to 5% by weight, preferably of 1.5% to 4.0% by weight and more preferably of 1.7% to 3.0% by weight, have the advantageous properties.

Cited hereinafter are particular embodiments 1 to 28 of the present invention.

1. Compositions comprising
   A) 50% to 90% by weight of at least one polymer selected from the group consisting of aromatic polycarbonate, aromatic polyestercarbonate and aromatic polyester,
   B) 5% to 40% by weight of polymer containing
      B.1 at least one rubber-modified vinyl (co)polymer containing
         B.1.1 80% to 95% by weight, based on B.1, of at least one vinyl monomer and
         B.1.2 5% to 20% by weight, based on B.1, of one or more elastomeric polybutadiene-containing graft bases,
         where B.1 contains
            polybutadiene-containing rubber particles which have been grafted with the vinyl monomers B1.1.1 and contain inclusions of vinyl (co)polymer consisting of the vinyl monomers B.1.1, and
            a vinyl (co)polymer matrix consisting of the vinyl monomers B.1.1 which is not bound to these rubber particles and is not included in rubber particles,
      and optionally B.2 further rubber particles grafted with vinyl monomers and composed of
         B.2.1 5% to 75% by weight, based on B.2, of at least one vinyl monomer and
         B.2.2 25% to 95% by weight, based on B.2, of one or more elastomeric graft bases,
   C) 3% to 25% by weight of a Mixture comprising a) at least one polyether-based polymer or copolymer selected from the group consisting of polyether block polymers and polyether-based polyurethanes and b) at least one boron-containing salt,
   D) 0% to 2% by weight of at least one UV stabilizer selected from the group consisting of the substance classes of the benzotriazoles and triazines,
   E) 0% to 20% by weight of one or more further additives,
   wherein the compositions comprising components A) to E) have a polybutadiene content of 1% to 5% by weight.

2. Compositions according to embodiment 1, wherein component A comprises aromatic polycarbonate.

3. Compositions according to embodiment 1, wherein component A is aromatic polycarbonate.

4. Compositions according to any of the preceding embodiments, wherein component B.1 is produced in bulk polymerization methods and the rubber particles containing vinyl (co)polymer inclusions in component B.1 have a median particle diameter D50 of 0.5 to 1.5 µm.

5. Compositions according to any of the preceding embodiments, wherein the rubber particles containing vinyl (co)polymer inclusions in component B.1 have a median particle diameter D50 of 0.7 to 1.0 µm.

6. Compositions according to any of the preceding embodiments, wherein component B.1 has a polybutadiene content of 8% to 13% by weight.

7. Compositions according to any e preceding embodiments, wherein component B.1.2 is pure butadiene rubber.

8. Compositions according to any of embodiments 1 to 6, wherein component B.1.2 is styrene-butadiene block copolymer rubber.

9. Compositions according to any of the preceding embodiments, wherein component B.2 has been produced in emulsion polymerization by grafting of
   B.2.1 25% to 50% by weight, based on the graft polymer B.2, of at least one vinyl monomer and
   B2.2 50% to 75% by weight, based on the graft polymer B.2, of one or more elastomeric graft bases with glass transition temperatures of <−70° C. and with median particle sizes D50 of 0.2 to 0.4 µm.

10. Compositions according to any of the preceding embodiments, wherein component B.2.2 is pure butadiene rubber.

11. Compositions according to any of embodiments 1 to 9, wherein component B.2.2 is styrene-butadiene block copolymer rubber.

12. Compositions according to any of embodiments 1 to 9, wherein component B.2 is an MBS modifier with core-shell structure.

13. Compositions according to any of the preceding embodiments, wherein the compositions are free of polyacrylate rubbers and silicone rubbers and of graft polymers that contain such rubbers as graft base.

14. Compositions according to any of the preceding embodiments, wherein component B comprises vinyl (co)polymer not chemically bonded to the rubber substrate and not included in the rubber particles which consists of the monomers according to B.1.1 or B.2.1 in a proportion of at least 50% by weight based on component B.

15. Compositions according to any of the preceding embodiments, wherein component B comprises vinyl (co)polymer not chemically bonded to the rubber substrate and not included in the rubber particles which consists of the monomers according to B.1.1 or 1.2.1 in a proportion of at least 70% by weight based on component B.

16. Compositions according to any of the preceding embodiments, wherein component B consists of component BA to an extent of at least 70% by weight.

17. Compositions according to any of the preceding embodiments, wherein the vinyl (co)polymer of component B that is not bound to rubber particles and not included in rubber particles has a weight-average molecular weight of 140 to 200 kg/mol.

18. Compositions according to any of the preceding embodiments, wherein the polyether-based polymer from component C) is a polyether-amide block copolymer consisting of 30% to 70% by weight, based on the block copolymer, of polyethylene glycol blocks and to an extent of 30% to 70% by weight, based on the block copolymer, of polyamide.

19. Compositions according to any of the preceding embodiments, wherein the boron-containing salt in component C is at least one alkali metal salt of a boron-centred anionic complex containing bidentate ligands selected from the group consisting of C2-C8 aliphatic or aromatic components having at least two reactive groups selected from —COOH and —OH.

20. Compositions according to embodiment 19, wherein the boron-containing salt is potassium bis(oxalato)borate or sodium bis(oxalato)borate.

21. Compositions according to any of the preceding embodiments, wherein component C comprises a further polymer selected from the group consisting of poly(meth)acrylates and polymethyl(meth)acrylates.

22. Compositions according to any of the preceding embodiments, wherein component C consists of
   69.6% to 98.6% by weight of polyether block polymer consisting to an extent of 30% to 70% by weight, based on the polyether block polymer, of polyethylene glycol blocks and to an extent of 70% to 30% by weight, based on the polyether block polymer, of nylon-12 blocks, 1% to 30% by weight of at least one further polymer selected from the group consisting of poly(meth)acrylates and polymethyl(meth)acrylates and 0.4% to 4.0% by weight of at least one representative selected from the group consisting of potassium bis(oxalato)borate and sodium bis(oxalato)borate.

23. Compositions according to any of the preceding embodiments, wherein component C has a specific surface resistance of less than $1 \cdot 10^9 \Omega$.

24. Compositions according to any of the preceding embodiments, wherein component C has a specific surface resistance of less than $1 \cdot 10^8 \Omega$.

25. Compositions according to any of the preceding embodiments, wherein component D is selected from the group consisting of the substance classes of the dimeric benzotriazoles and the 1,3,5-triazines.

26. Compositions according to any of the preceding embodiments consisting of components A) to E).

27. Use of compositions according to any of embodiments 1 to 26 for producing moulded articles.

28. Moulded articles produced from compositions according to any of embodiments 1 to 26.

DETAILED DESCRIPTION OF THE INVENTION

Component A

Employable components A include an aromatic polycarbonate, an aromatic polyestercarbonate, an aromatic polyester or a mixture of a plurality of representatives of one or more of these substance classes according to the description hereinabove.

Component A preferably comprises aromatic polycarbonate.

It is particularly preferable when one or more aromatic polycarbonates are employed as component A.

Aromatic polycarbonates and/or aromatic polyestercarbonates in accordance with component A which are suitable in accordance with the invention are known from the literature or preparable by processes known from the literature (for preparation of aromatic polycarbonates see, for example, Schnell, "Chemistry and Physics of Polycarbonates", Interscience Publishers, 1964, and also DE-B 1 495 626, DE-A 2 232 877, DE-A 2 703 376, DE-A 2 714 544, DE-A 3 000 610, DE-A 3 832 396 for preparation of aromatic polyestercarbonates, for example DE-A 3 077 934).

Aromatic polycarbonates are produced by way of example by reaction of diphenols with carbonyl halides, preferably phosgene and/or with aromatic diacyl dihalides, preferably dihalides of benzenedicarboxylic acids, by the interfacial process, optionally using chain terminators, for example monophenols, and optionally using trifunctional or more than trifunctional branching agents, for example triphenols or tetraphenols. Production via a melt polymerization process by reaction of diphenols with, for example, diphenyl carbonate is likewise possible.

Diphenols for the production of the aromatic polycarbonates and/or aromatic polyester carbonates are preferably those of formula (1)

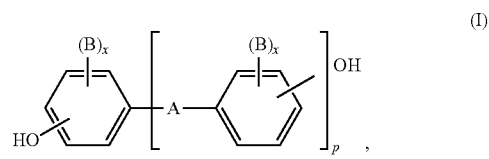

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, onto which further aromatic rings optionally comprising heteroatoms may be condensed, or a moiety of formula (II) or (III)

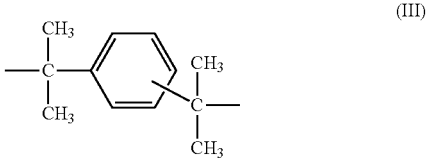

B is in each case $C_1$ to $C_{12}$-alkyl, preferably methyl, halogen, preferably chlorine and/or bromine, x is independently at each occurrence 0, 1 or 2, p is 1 or 0, and $R^5$ and $R^6$ can be chosen individually for each $X^1$ and are each independently hydrogen or $C_1$- to $C_6$-alkyl, preferably hydrogen, methyl or ethyl, $X^1$ represents carbon and m is an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl) ethers, bis(hydroxyphenyl) sulphoxides, bis(hydroxyphenyl) ketones, bis(hydroxyphenyl) sulphones and α,α-bis(hydroxyphenyl)diisopropylbenzenes, and also ring-brominated and/or ring-chlorinated derivatives of these.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxybiphenyl sulphide, 4,4'-dihydroxybiphenyl sulphone, and also the di- and tetrabrominated or chlorinated derivatives of these, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-bis(4-hydroxyphenyl)propane (bisphenol A) is especially preferred.

The diphenols may be used individually or in the form of any desired mixtures. The diphenols are known from the literature or obtainable by processes known from the literature.

Examples of chain terminators suitable for producing the thermoplastic aromatic polycarbonates include phenol, p-chlorophenol, p-tert-butylphenol or 2,4,6-tri bromophenol, but also long-chain alkylphenols such as 4-[2-(2,4,4-trimethylpentyl)]phenol, 4-(1,3-tetramethylbutyl)phenol according to DE-A 2 842 005 or monoalkylphenol or dialkylphenols having a total of 8 to 20 carbon atoms in the alkyl substituents, such as 3,5-di-tert-butylphenol, p-isooctylphenol, p-tert-octylphenol, p-dodecylphenol and 2-(3,5-dimethytheptyl)phenol and 4-(3,5-dimethylheptyl)phenol. The amount of chain terminators to be employed is generally between 0.5 mol % and 10 mol % based on the molar sum of the diphenols used in each case.

The thermoplastic aromatic polycarbonates may be branched in a known manner, and preferably through incorporation of 0.05 to 2.0 mol %, based on the sum of the diphenols used, of trifunctional or more than trifunctional compounds, for example those having three or more phenolic groups.

Both homopolycarbonates and copolycarbonates are suitable. Production of inventive copolycarbonates according to component A may also employ 1% to 25% by weight, preferably 2.5% to 25% by weight, based on the total amount of diphenols to be employed, of polydiorganosiloxanes having hydroxyaryloxy end groups. These are known (U.S. Pat. No. 3,419, 634) and can be produced by processes known from the literature. The production of copolycarbonates comprising polydiorganosiloxane is described in DE-A 3 334 782.

Preferred polycarbonates are not only bisphenol A homopolycarbonates but also copolycarbonates of bisphenol A comprising up to 15 mol %, based on the molar sums of diphenols, of other diphenols mentioned as preferred or particularly preferred, in particular 2,2- bis(3,5-dibromo-4-hydroxyphenyl)propane.

Aromatic diacyl dihalides for the production of aromatic polyester carbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacyl dichlorides of isophthalic acid and of terephthalic acid in a ratio of from 1:20 to 20:1.

Production of polyester carbonates additionally makes concomitant use of a carbonyl halide, preferably phosgene, as bifunctional acid derivative.

Chain terminators that can be used for the production of the aromatic polyester carbonates are not only the abovementioned monophenols but also the chlorocarbonic esters of these, and also the acyl chlorides of aromatic monocarboxylic acids, which can optionally have substitution by $C_1$ to $C_{22}$-alkyl groups or by halogen atoms; aliphatic $C_2$ to $C_{22}$-monoacyl chlorides can also be used as chain terminators here.

The quantity of chain terminators in each case is from 0.1 to 10 mol %, based on moles of diphenol in the case of the phenolic chain terminators and on moles of diacyl dichloride in the case of monoacyl chloride chain terminators.

The aromatic polyester carbonates may also incorporate aromatic hydroxycarboxylic acids.

The aromatic polyester carbonates may be either linear or else branched in a known manner; (in this connection see DE-A 2 940 024 and DE-A 3 007 934).

Examples of branching agents that can be used are acyl chlorides having a functionality of three or higher, e.g. trimesoyl trichloride, cyanuroyl trichloride, 3,3',4,4'-benzophenonetetracarbonyl tetrachloride, 1,4,5,8-naphthalenetetracarbonyl tetrachloride or pyromellitoyl tetrachloride, in quantities of from 0.01 to 1.0 mol % (based on diacyl dichlorides used) or tri- or polyfunctional phenols, such as phloroglucinol, 4,6-dimethyl-2,4,6-tri(4-hydroxyphenyl) hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl) propane, tetra(4-[4-hydroxyphenylisopropyl]phenoxy) methane, 1,4-bis[4,4'-dihydroxytriphenyl)methyl]benzene, in quantities of from 0.01 to 1.0 mol %, based on diphenols used. Phenolic branching agents can be used as initial charge with the diphenols, and acyl chloride branching agents can be introduced together with the acyl dichlorides.

The proportion of carbonate structural units in the thermoplastic aromatic polyester carbonates can vary as desired. The proportion of carbonate groups is preferably up to 100 mol %, in particular up to 80 mol %, particularly preferably up to 50 mol %, based on the sum of ester groups and carbonate groups. The ester fraction of the aromatic polyester carbonates, and also the carbonate fraction thereof, can take the form of blocks or can have random distribution in the polycondensate.

In a preferred embodiment, the aromatic polycarbonates or polyestercarbonates suitable as component A have a weight-average molecular weight $M_w$ (determined by gel permeation chromatography (GPC) in methylene chloride with polycarbonate as standard) of 15 000 g/mol to 50 000 g/mol, preferably of 22 000 g/mol to 35 000 g/mol, in particular of 24 000 to 32 000 g/mol.

In preferred embodiments contemplated aromatic polyesters are polyalkylene terephthalates. In particularly preferred embodiments reaction products of aromatic dicarboxylic acids or reactive derivatives thereof, such as dimethyl esters or anhydrides, and aliphatic, cycloaliphatic or araliphatic dolls and also mixtures of these reaction products are concerned here.

Particularly preferred aromatic polyalkylene terephthalates comprise at least 80% by weight, preferably at least 90% by weight, based on the dicarboxylic acid component of tereplithalic acid radicals and at least 80% by weight, preferably at least 90% by weight, based on the diol component of ethylene glycol andlor butane-1,4-diol radicals.

The preferred aromatic polyalkylene terephthalates may comprise not only terephthalic acid radicals but also up to 20 mol %, preferably up to 10 mol %, of radicals of other aromatic or cycloaliphatic dicarboxylic acids having 8 to 14 carbon atoms or aliphatic dicarboxylic acids having 4 to 12 carbon atoms, for example radicals of phthalic acid, isophthalic acid, naphthalene-2,6-dicarboxylic acid, 4,4'-dipbenyldicarboxylic acid, succinic acid, adipic acid, sebacic acid, azelaic acid, cyclohexanediacetic acid.

The preferred aromatic polyalkylene terephthalates may comprise not only ethylene glycol and/or butane-1,4-diol radicals but also up to 20 mol %, preferably up to 10 mol %, of other aliphatic diols having 3 to 12 carbon atoms or cycloaliphatic diols having 6 to 21 carbon atoms, for example radicals of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di(β-hydroxyethoxy)benzene, 2,2-bis (4-hydroxycyclohexyl)propane, 2,4-dihydroxy-1,1,3,3-tetramethylcyclobutane, 2,2-bis(4-β-hydroxyethoxyphenyl) propane and 2,2-bis(4-hydroxypropoxyphenyl)propane (DE-A 2 407 674, 2 407 776, 2 715 932).

The aromatic polyalkylene terephthalates may be branched through incorporation of relatively small amounts of tri- or tetrahydric alcohols or tri- or tetrabasic carboxylic acids, for example according to DE-A 1 900 270 and US-A 3 692 744. Examples of preferred branching agents are trimesic acid, trimellitic acid, trimethylolethane and trimethylolpropane, and pentaerythritol.

Particular preference is given to aromatic polyalkylene terephthalates which have been prepared solely from terephthalic acid and the reactive derivatives thereof (e.g. the dialkyl esters thereof) and ethylene glycol and/or butane-1,4-diol, and to mixtures of these polyalkylene terephthalates.

Preferred mixtures of aromatic polyalkylene terephthalates comprise 1% to 50% by weight, preferably 1% to 30% by weight, of polyethylene terephthalate and 50% to 99% by weight, preferably 70% to 99% by weight, of polybutylene terephthalate.

The preferably used aromatic polyalkylene terephthalates have a viscosity number of 0.4 to 1.5 dl/g, preferably 0.5 to 1.2 dl/g, measured in phenol/o-dichlorobenzene (1:1 parts by weight) in a concentration of 0.05 g/ml according to ISO 307 at 25° C. in an Ubbelohde viscometer.

The aromatic polyalkylene terephthalates can be prepared by known methods (see, for example, Kunststoff-Handbuch [Plastics Handbook], volume VIII, p. 695 et seq., Carl-Hanser-Verlag, Munich 1973).

Component B

The rubber-modified vinyl (co)polymers usable in accordance with the invention as component B contain, preferably to an extent of at least 70% by weight, more preferably to an extent of at least 85% by weight, further preferably to an extent of at least 95% by weight and in the most preferred embodiment 100% by weight, based on component B, a first rubber-modified vinyl (co)polymer B.1, preferably prepared in a bulk polymerization process, containing a disperse phase composed of polybutadiene-containing rubber particles grafted with vinyl monomers B.1.1 and having inclusions of vinyl (co)polymer consisting of the vinyl monomers B.1.1, and a rubber-free vinyl (co)polymer matrix consisting of the vinyl monomers B.1.1 which is not bound to the rubber particles and not included in the rubber particles, wherein the rubber particles containing vinyl (co)polymer inclusions have a median particle diameter D50 measured by ultracentrifugation of 0.3 to 10.00 μm, preferably 0.5 to 1.5 μm and especially of 0.7 to 1.0 μm, which has a polybutadiene content of 5% to 18% by weight, preferably of 7% to 15% by weight and especially of 8% to 13% by weight.

The rubber-modified vinyl (co)polymers according to component B.1 have a melt volume flow rate (MVR), measured according to ISO 1133 (2012 version) at 220° C. with a ram load of 10 kg, of preferably 2 to 15 ml/10 min, more preferably 3 to 10 ml/10 min and especially 4 to 8 ml/10 min.

Rubber-modified vinyl (co)polymers B.1 of this kind are prepared by polymerization of B.1.1 preferably 80% to 95% by weight, more preferably 83% to 93% by weight and further preferably 85% to 92% by weight, based on the rubber-modified vinyl (co)polymer B.1, of at least one vinyl monomer in the presence of B.1.2 preferably 5% to 20% by weight, more preferably 7% to 17% by weight and further preferably 8% to 15% by weight, based on the rubber-modified vinyl (co)polymer B.1, of one or more elastomeric polybutadiene-containing graft bases with glass transition temperatures of <−50° C., further preferably of <−60° C. and more preferably <−70° C.

Unless expressly stated otherwise in the present invention the glass transition temperature is determined for all components by differential scanning calorimetry (DSC) according to DIN 61006 (1994 version) at a heating rate of 10 K/min with determination of Tg as the midpoint temperature (tangent method).

The bulk polymerization reaction preferably employed for preparation of the rubber-modified vinyl (co)polymer B.1 comprises both the polymerization of the vinyl monomers according to B.1.1 and grafting of the vinyl (co)polymer thus formed onto the elastomeric graft base according to B.1.2. Additionally formed in this reaction regime, as a result of self-organization (phase separation), is a rubber-containing phase likewise comprising phase-separated inclusions and composed of vinyl (co)polymer consisting of the monomers according to B.1.1, this rubber-containing phase being in dispersed form in a vinyl (co)polymer matrix formed from the monomers according to B.1.1. Inclusions are understood to mean that vinyl (co)polymer is embedded within the rubber particles. The vinyl (co)polymer may be chemically bonded to the elastomeric graft base or be included in the form of unattached polymer chains. The included vinyl (co)polymer cannot be leached out by means of standard solvents such as acetone.

The size of the rubber particles in the rubber-modified vinyl (co)polymers B.1 thus prepared is adjusted via the conditions of the reaction regime, such as the temperature and resulting viscosity of the polymer and shear as a result of stirring, for example.

The median particle size D50 is the diameter with 50% by weight of the particles above it and 50% by weight below it. Unless expressly stated otherwise in the present invention it is determined for all components by means of ultracentrifuge measurement (W. Scholtan, H. Lange, Kolloid, Z. and Z. Polymere 250 (1972), 782-1796).

The monomers B.1.1 are preferably mixtures of

B.1.1.1 65 to 85 parts by weight, more preferably 70 to 80 parts by weight and further preferably 74 to 78 parts by weight, based in each case on the sum of B.1.1.1 and B.1.1.2, of vinylaromatics and/or ring-substituted vinylaromatics (such as styrene, α-methyl styrene, p-methylstyrene, p-chlorostyrene) and/or (C1-C8)-alkyl (meth)acrylates, such as methyl methacrylate, ethyl methacrylate, and B.1.1.2 15 to 35 parts by weight, more preferably 20 to 30 parts by weight, further preferably 22 to 26 parts by weight, based in each case on the sum of B.1.1.1 and B.1.1.2, of vinyl cyanides (unsaturated nitriles such as acrylonitrile and rnethacrylonitrile) and/or (C1-C8)-alkyl (meth)acrylates, such as methyl methacrylate, n-butyl acrylate, t-butyl acrylate, and/or derivatives (such as anhydrides and imides) of unsaturated carboxylic acids, for example maleic anhydride.

Preferred monomers B.1.1.1 are selected from at least one of the monomers styrene, α-methylstyrene and methyl methacrylate. Preferred monomers B.1.1.2 are selected from at least one of the monomers acrylonitrile, butyl acrylate, maleic anhydride and methyl methacrylate. Particularly preferred monomers are B.1.1.1 styrene and B.1.1.2 acrylonitrile. In a further preferred embodiment, B.1.1 is styrene and B.1.1.2 is a mixture of acrylonitrile and butyl acrylate.

Preferred graft bases B.1.2 are diene rubbers containing butadiene, or mixtures of diene rubbers containing butadiene or copolymers of diene rubbers containing butadiene or mixtures thereof with further copolymerizable monomers (for example according to B.1.1.1 and B.1.1.2).

A particularly preferred graft base B.1.2 is pure polybutadiene rubber. In a further preferred embodiment B.1.2 is styrene-butadiene block copolymer rubber.

The rubber-modified vinyl (co)polymers according to component B may contain up to 30% by weight, preferably up to 15% by weight and further preferably up to 5% by weight, based on component B, of further rubber particles (graft polymers) B.2 which have been grafted with vinyl monomers and have an elastomeric core and a vinyl (co)polymer shell, preferably prepared in an emulsion polymerization method. In a particularly preferred embodiment, component B, however, does not contain any such graft polymer B.2.

Graft polymers having an elastomeric core and a vinyl (co)polymer shell that are usable in accordance with the invention in such a way as a constituent of component B.2 are one or more graft polymers prepared by grafting of B.2.1 5% to 75% by weight, preferably 10% to 60% by weight and more preferably 25% to 50% by weight, based on the graft polymer B.2, of at least one vinyl monomer onto B.2.2 25% to 90% by weight, preferably 40% to 90% by weight and more preferably from 50% to 75% by weight, based on the graft polymer B.2, of one or more elastomeric graft bases.

The graft bases B.2.2 preferably have glass transition temperatures of <−30° C., further preferably of <−50° C., more preferably <−70° C.

The graft base B.2.2 of the graft polymers B.2 generally has a median particle size (D50) of 0.05 to 1.00 µm, preferably 0.10 to 0.7 µm, further preferably 0.15 to 0.5 µm, and more preferably of 0.2 to 0.4 µm.

The monomers B.2.1 used for the graft polymers B.2 are preferably mixtures of

B.2.1.1 50 to 90 parts by weight, more preferably 70 to 80 parts by weight, based in each case on the sum of B.2.1.1 and B.2.1.2, of vinylaromatics and/or ring-substituted vinylaromatics (such as styrene, α-methylstyrene, p-methylstyrene, p-chlorostyrene) and/or (C1-C8)-alkyl (meth)acrylates, such as methyl methacrylate, ethyl methacrylate, and B.2.1.2 10 to 50 parts by weight, more preferably 20 to 30 parts by weight, based in each case on the sum of B.2.1.1 and B.2.1.2, of vinyl cyanides (unsaturated nitriles such as acrylonitrile and methacrytonitrile) and/or (C1-C8)-alkyl (meth)acrylates, such as methyl methacrylate, n-butyl acrylate, t-butyl acrylate, and/or derivatives (such as anhydrides and imides) of unsaturated carboxylic acids, for example maleic anhydride.

Preferred monomers B.2,1.1 for the graft polymers B.2 are selected from at least one of the monomers styrene, α-methylstyrene and methyl methacrylate; preferred monomers B.2.1.2 are selected from at least one of the monomers acrylonitrile, maleic anhydride and methyl methacrylate. Particularly preferred monomers are B.2.1.1 styrene and B.2.1.2 acrylonitrile or B.2.1.1 styrene and B2.1.2 methyl methacrylate or B.2.1.1=B.2.1.2 methyl methacrylate.

Suitable graft bases B.2.2 of the graft polymers B.2 include for example diene rubbers, EP(D)M rubbers, i.e. those based on ethylene/propylene and optionally dienes, and acrylate, polyurethane, silicone, chloroprene, ethylene/vinyl acetate and also acrylate-silicone composite rubbers.

Preferred graft bases B.2.2 are diene rubbers, preferably comprising butadiene or copolymers of dienes, preferably comprising butadiene, and further copolymerizable vinyl monomers (e.g. according to B.2.1.1 and B.2.1.2) or mixtures of one or more of the aforementioned components.

A particularly preferred graft base B.2.2 for the graft polymers B.2 is pure polybutadiene rubber. In a further preferred embodiment, B.2.2 is styrene-butadiene rubber, more preferably styrene-butadiene block copolymer rubber.

Particularly suitable graft polymers B.2 are, for example, ABS polymers, in a preferred embodiment those which are prepared by the emulsion polymerization process via redox initiation with an initiator system composed of organic hydroperoxide and ascorbic acid according to U.S. Pat. No 4,937,285.

Further particularly suitable graft polymers B.2 are MBS modifiers having a core-shell structure.

In a particularly preferred embodiment, component B does not contain any graft polymers B.2 based on acrylate, silicone or acrylate-silicone composite rubbers as graft base B.2.2, since these adversely affect the colouring characteristics of the compositions according to the invention.

Particularly preferred rubber-modified vinyl (co)polymers according to component B are, for example, ABS polymers (emulsion, bulk and suspension ABS), as described, for example, in DE-A 2 035 390 (=U.S. Pat. No. 3,644,574) or in DE-A 2 248 242 (=GB-A 1 409 275), or in Ullmann's, Enzyklopädie der Technischen Chemie [Ullmann's Encyclopedia of Industrial Chemistry], Vol. 19 (1980), p. 280 ff.

The rubber-modified vinyl (co)polymers according to component B contain free vinyl (co)polymer, i.e. vinyl (co)polymer not chemically bound to the graft base(s) B.1.2 or B.2.2 and not incorporated into the rubber particles, consisting of the monomers according to B.1.1 or B.2.1. This can arise from the preparation in the polymerization of the graft polymers B.1 or B.2, or else they can be polymerized separately and mixed into component B. It is likewise possible for a portion of the free vinyl (co)polymer in the rubber-modified vinyl (co)polymer according to component B to originate from the preparation of the polymers B.1 or B.2 themselves, and for another portion to be separately polymerized and admixed with component B. The proportion of free vinyl (co)polymer (irrespective of its origin), measured as the acetone-soluble fraction, in component B is preferably at least 50% by weight, particularly preferably at least 60% by weight, more preferably at least 70% by weight, based on component B.

This free vinyl (co)polymer in the rubber-modified vinyl copolymers according to component B has a weight-average molecular weight $M_w$ of 70 to 250 kg/mol, preferably of 140 to 200 kg/mol, in particular of 150 to 180 kg/mol.

In the context of the present invention, the weight average molecular weight Mw of the free vinyl (co)polymer in component B is measured by gel permeation chromatography (GPC) in tetrahydrofuran against a polystyrene standard.

Component C

Component C is an ion-conductive polymer or polymer blend comprising at least one polyether-based polymer or copolymer selected from the group consisting of polyether block polymers and polyether-based polyurethanes and at least one boron-containing salt.

Component C is preferably an ion-conductive polymer or polymer blend containing at least one polyether block polymer and at least one boron-containing salt.

Examples of polyether block polymers include block copolymers comprising polyether blocks and polymer blocks selected from at least one representative of the group consisting of polyamides, polyolefins, polyesters and polyacrylates. Preference is Oven to polyether block amides (PEBA) and polyetherester block amides, and also mixtures of these polymers. Polyether block amides (PEBA) are particularly preferred.

These block copolymers preferably contain 10% to 90% by weight, more preferably 20% to 80% by weight and further preferably 30% to 70% by weight, based on the block copolymer, of polyether blocks.

The polyether block fraction in the block copolymer preferably consists to an extent of at least 50% by weight, more preferably to an extent of at least 80% by weight and further preferably to an extent of at least 90% by weight of ethylene glycol units. In the most preferred embodiment, the polyether blocks are pure polyethylene glycol.

The polyether block amides employed in component C are preferably polyether block amides (PEBA) consisting of thermoplastic hard segments of polyamide sequences and elastomeric soft segments of polyether sequences which are linked to one another either via ester or amide groups. Such polyether block amides are obtainable by linking terminally functionalized, preferably terminally carboxylate-functionalized oligoamides with difunctional oligoethers, preferably with oligoethers having hydroxyl or amino end groups. The polyamide employed in the polyether block amides (PEBA) is preferably nylon-12.

The polyether block amides (PEBA) particularly preferably consist of polyethylene glycol and nylon-12 blocks.

In a preferred embodiment, component C comprises as the polyether-based polymer a polyether block polymer consisting, to an extent of 10% to 90% by weight, more preferably 20% to 80% by weight and further preferably 30% to 70% by weight, based on the block copolymer, of polyethylene glycol blocks and to an extent of 10% to 90% by weight, more preferably 20% to 80% by weight and further preferably 30% to 70% by weight, based on the block copolymer, of nylon-12.

The polyether block polymers employed in component C are known from-the literature and disclosed for example in U.S. Pat. No. 4871804 (Daicel), EP 730005 (General Electric), EP 613919 (Sanyo Kasai), EP 1046675 (Arkema), EP 1155065 (Arkema) EP 1262527 (Arkema) and JP 09137053 (Asahi).

Component C contains the polyether-based polymer or copolymer preferably in a concentration of 49.8% to 99.8% by weight, more preferably of 69.6% to 98.6% by weight and further preferably of 79.0% to 89.0% by weight.

Component C preferably contains 0.2% to 10.0% by weight, further preferably 0.4% to 4.0% by weight and most preferably 1.0% to 3.0% by weight, based in each case on component C, of a boron-containing salt.

The boron-containing salt in component C is preferably at least one alkali metal salt of a boron-centred anionic complex comprising bidentate ligands selected from the group consisting of C2-C8 aliphatic or aromatic components having at least two reactive groups selected from —COOH and —OH.

In particularly preferred embodiments, the boron-containing salt in component C is an alkali metal salt of the bis(oxalato)borate anion, more preferably potassium bis(oxalato)borate or sodium bis(oxalato)borate, most preferably potassium bis(oxalato)borate.

Component C may comprise further polymers selected from at least one representative from the group consisting of polyamides, polyesters, poly(meth)acrylates, polymethyl (meth)acrylates and polyurethanes. Component C preferably comprises a further polymer selected from the group consisting of poly(meth)acrylates and polymethyl(meth)acrylates, more preferably polymethylmethacrylate. This further polymer is used in component C in a concentration of 0% to 50.0% by weight, preferably of 1.0% to 30.0% by weight, more preferably of 10.0% to 20.0% by weight, based in each case on component C.

Component C may comprise one or more ionomers. Preference is given to using ionomers which are formed by neutralization of co- or terpolymers consisting of ethylene and acrylic acid and/or methacrylic acid.

More preferably, component C comprises 49.8% to 99.8% by weight, further preferably 69.6% to 98.6% by weight and most preferably 79% to 89% by weight of polyether block polymer consisting to an extent of 10% to 90% by weight, more preferably 20% to 80% by weight and further preferably 30% to 70% by weight, based on the block copolymer, of polyethylene glycol blocks and to an extent of 10% to 90% by weight, more preferably 20% to 80% by weight and further preferably 30% to 70% by weight, based on the block copolymer, of nylon-12, 0% to 50% by weight, further preferably 1% to 30% by weight and most preferably 10% to 20% by weight of a further polymer selected from at least one representative from the group consisting of poly(meth)acrylates and polymethyl(meth)acrylates, more preferably polymethylmethacrylate, and 0.2% to 10% by weight, further preferably 0.4% to 4.0% by weight and most preferably 1.0% to 3.0% by weight of an alkali metal salt of a boron-centred anionic complex containing bidentate ligands selected from the group consisting of C2-C8 aliphatic or aromatic components having at least two reactive groups selected from —COOH and —OH, more preferably a representative from the group consisting of potassium bis (oxalato)borate and sodium bis(oxalato)borate, especially preferably potassium bis(oxalato)borate.

In the most preferred embodiment, component C consists of the aforementioned constituents, i.e. does not contain any further constituents.

In a further embodiment, component C has a specific surface resistance of less than $1 \cdot 10^9 \Omega$, preferably less than $1 \cdot 10^8 \Omega$.

Specific surface resistance is determined in the context of the present invention according to IEC 60093 (in the 1993 version).

In a further embodiment, the various constituents of component C are processed to give a preliminary compound and used for production of the moulding compounds of the invention in the form of a preliminary compound.

An example of a suitable component C is IonPhaseE® IPE® U1 from IonPhaseE Oy (Tampere, Finland). In a preferred embodiment, this commercial product is used as component C.

Component D

As component D, it is possible to use UV stabilizers selected from at least one representative from the group consisting of the substance classes of the benzotriazoles and triazines, more preferably the dimeric benzotriazoles and the 1,3,5-triazines.

Benzotriazoles that are suitable in accordance with the invention are supplied, for example, by BASF AG (Ludwigshafen, Germany) under the following trade names: Tinuvin™ 360, Tinuvin™ 213, Tinuvin™ P, Tinuvin™ 234, Tinuvin™ 326, Tinuvin™ 328, Tinuvin™ 329, Tinuvin™ 350 and Tinuvin™ 571. Preference is given to the use of dimeric benzotriazoles.

Particular preference is given to the use of 2,2'-methylenebis[6-(2H-benzotriazol-2-yl)-4-(1,1,3,3-tetramethylbutyl)phenol] of the formula

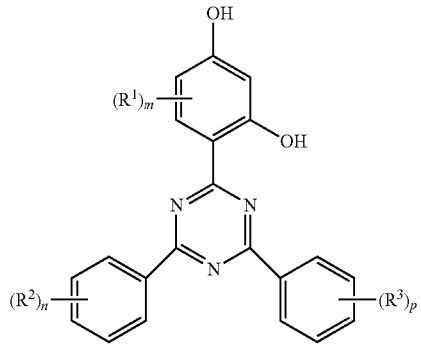

, which is supplied, for example, under the Tinuvin™ 360 trade name.

Triazines that are suitable in accordance with the invention are supplied, for example, by BASF AG (Ludwigshafen, Germany) under the Tinuvin™ 1577 and Tinuvin™ 1600 trade names and by Adeka Palmarole SAS (Mulhouse, France) under the ADK Stab™ LA46 trade name.

In a preferred embodiment, a 2-(4,6-diaryl-1,3,5-triazin-2-yl)-5-(alkoxy)phenol of the general formula

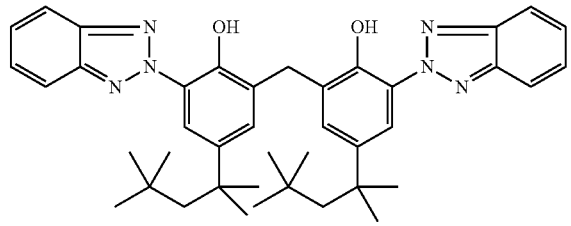

is used as UV stabilizer, in which

R$^1$, R$^2$ and R$^3$ are independently identical or different radicals selected from the group consisting of C1- to C8-alkyl or C1- to C8-aryl, n and p are independently each an integer from 0 to 5, preferably 0, 1 or 2, more preferably 0 or 1, m is an integer from 0 to 4, preferably 0 or 1, more preferably 0, and R is any organic radical composed of carbon, hydrogen and optionally oxygen, preferably C1- to C10-alkyl, where R$^2$ and R$^3$ are preferably methyl or phenyl, more preferably phenyl;

Preference is further given to at least one representative selected from the group consisting of 2-(4,6-diphenyl-1,3,5-triazin-2-yl)-5-(hexyloxy)phenol, 2-(4,6-diphenyl-1,3,5-triazin-2-yl)-5-[2-(2-ethylhexanoyloxy)ethoxy]phenol and the compound of the formula

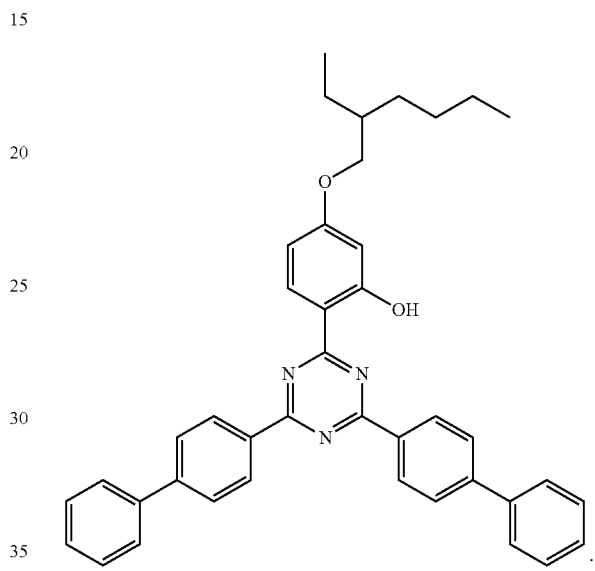

More preferably, the triazine used in accordance with the invention is the compound of the formula

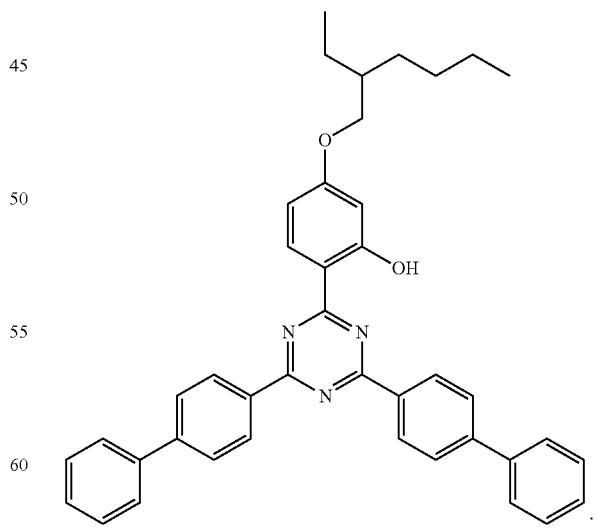

This is supplied by BASF AG under the Tinuvin™ 1600 trade name.

In a preferred embodiment, the UV stabilizer used is at least one representative selected from the group consisting of the compounds of the formulae

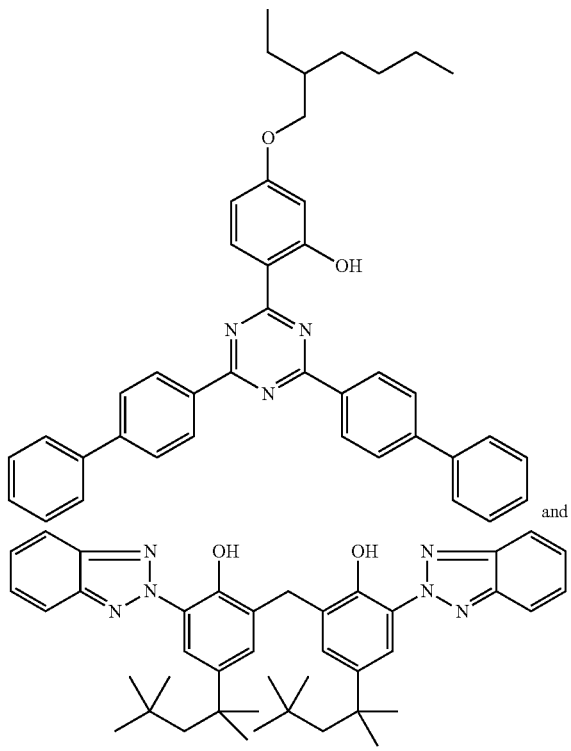

and

Component E

The composition may comprise, as component E, one or more further additives, preferably selected from the group consisting of flame retardants (e.g. organic phosphorus or halogen compounds, in particular bisphenol-A-based oligophosphate), anti-drip agents (for example compounds of the substance classes of fluorinated polyolefins, silicones and aramid fibers), flame retardant synergists (for example nanoscale metal oxides), smoke inhibitors (for example zinc borate), lubricants and demoulding agents (for example pentaerythritol tetrastearate), nucleating agents, further antistats and conductivity additives distinct from component C, further stabilizers distinct from component D (e.g. hydrolysis, heat-ageing and transesterification stabilizers, further UV stabilizers and acid/base quenchers distinct from component D), colourants (e.g. organic or inorganic pigments such as titanium dioxide, azo pigments and carbon black, and organic soluble dyes), flow promoters, compatibilizers, further impact modifiers without a core-shell structure that are distinct from component B, further polymeric constituents distinct from components A to C (for example functional blend partners), and also fillers and reinforcers (for example, carbon fibers, talc, mica, kaolin, $CaCO_3$).

In a preferred embodiment the composition is free from flame retardants, anti-drip agents, flame retardant synergists and smoke inhibitors.

In a likewise preferred embodiment the composition is free from fillers and reinforcers.

In a further-preferred embodiment, the composition is free of further antistats or conductivity additives distinct from component C.

In a further-preferred embodiment, the composition is free of further UV stabilizers distinct from component D.

In a particularly preferred embodiment, the composition is free of flame retardants, anti-drip agents, flame retardant synergists, smoke inhibitors, fillers and reinforcers, further antistats or conductivity additives distinct from component C, and further UV stabilizers distinct from component D.

In a preferred embodiment, the composition comprises at least one polymer additive selected from the group consisting of lubricants and demoulding agents, stabilizers, flow promoters and compatibilizers.

In a preferred embodiment, the composition comprises, as stabilizer, at least one representative selected from the group consisting of sterically hindered phenols, organic phosphites, sulphur-based co-stabilizers and organic or inorganic Brønsted acids.

Production of the Moulding Compounds and Moulded Articles

The thermoplastic moulding compounds according to the invention can be produced for example by mixing the respective constituents and melt compounding and melt extruding the resulting mixture at temperatures of preferably 200° C. to 320° C., Mere preferably at 240° C. to 300° C., In customary apparatuses, for example internal kneaders, extruders and twin-shaft screw systems, in a known manner.

The mixing of the individual constituents may be carried out in a known manner, either successively or simultaneously, either at about 20° C. (room temperature) or at a higher temperature.

The invention therefore also provides a process for producing the compositions according to the invention.

The moulding compounds according to the invention may be used for producing moulded articles of any kind. These can by way of example be produced by injection moulding, extrusion and blow-moulding processes. Another type of processing is the production of moulded articles by thermoforming from prefabricated sheets or films.

Examples of these moulded articles are films, profiles, housing parts of any type, e.g. for domestic equipment such as juice presses, coffee machines, mixers; for office machinery such as monitors, fiat screens, notebooks, printers, copiers; sheets, pipes, electrical-installation ducts, windows, doors and other profiles for the construction sector (internal fitting-out and external application), and also electrical and electronic components such as switches, plugs and sockets, and components for commercial vehicles, in particular for the automobile sector. The compositions of the invention are also suitable for the production of the following moulded articles or moulded parts: components for internal fitting-out of rail vehicles, of ships, of aircraft, of buses and other motor vehicles, bodywork components for motor vehicles, housings of electrical equipment comprising small transformers, housings for equipment for the processing and transmission of information, housings and cladding for medical equipment, massage equipment and housings therefor, toy vehicles for children, large-surface-area wall elements, housings for safety equipment, thermally insulated transport containers, moulded parts for sanitation equipment and for bath equipment, protective grilles for ventilation openings and housings for garden equipment.

The moulding compounds according to the invention are particularly suitable for the production of permanently antistatic mouldings having a low propensity for dust attraction, particularly preferably for uncoated decorative components in automotive interiors.

The present invention also relates to the use of the envisaged and claimed compositions for producing moulded articles and to the moulded articles themselves which comprise one of these compositions.

EXAMPLES

Component A:
Linear polycarbonate based on bisphenol A with weight-average molecular weight $M_w$ of 30,000 g/mol (determined by GPC in methylene chloride against a BPA-PC standard).

Component B1:
Acrylonitrile-butadiene-styrene (ABS) polymer prepared by the bulk polymerization process, comprising a disperse phase of polybutadiene-containing rubber particles with inclusions of styrene-acrylonitrile copolymer and a styrene-acrylonitrile-copolymer matrix and having an A:B:S ratio of 23:10:67% by weight and a gel content, determined as the acetone-insoluble fraction, of 20% by weight. The free, i.e. acetone-soluble, styrene-acrylonitrile copolymer in component B1 has a weight average molecular weight $M_w$ (measured by GPC in acetone as solvent with polystyrene standard) of 165 kg/mol. The median rubber particle size D50, measured by ultracentrifugation, is 0.85 µm. The melt volume flow rates (MVR) of component B1, measured according to ISO 1133 (2012 version) at 220° C. with a ram load of 10 kg, is 6.7 ml/10 min.

Component B2:
ABS blend composed of 20% by weight of an acrylonitrile-butadiene-styrene (ABS) graft polymer prepared by the emulsion polymerization process, with an A:B:S ratio of 14:50:36% by weight and 80% by weight of a styrene-acrylonitrile copolymer with an acrylonitrile:styrene ratio of 25:75% by weight and a weight-average molecular weight $M_w$ (measured by GPC in acetone as solvent with polystyrene as standard) of 110 kg/mol. The mixture thus has an A:B:S ratio of 23:10:67% by weight. The median rubber particle size D50, measured by ultracentrifugation, is 0.32 µm. The rubber particles do not contain any inclusions.

Component B3:
ASA blend composed of 37% by weight of a graft polymer having a polybutylacrylate rubber core and a polymethylmethacrylate shell, where the graft polymer has a core/shell ratio of 70:30% by weight, prepared by the emulsion polymerization process, and 63% by weight of a styrene-acrylonitrile copolymer with an acrylonitrile:styrene ratio of 24:76% by weight, The mixture thus has a butyl acrylate rubber content of 26% by weight.

Component C1:
Mixture comprising 15% by weight of polymethylmethacrylate, 83.5% of a polyetheramide block polymer (PEBA) consisting to an extent of 50% by weight, based on the PEBA, of polyethylene glycol blocks and to an extent of 50% by weight, based on the PEBA, of nylon-12 blocks, and 1.5% by weight of potassium bis(oxalato)borate. C1 has a specific surface resistance (measured according to IEC 60093 in the 1993 version) of $8 \cdot 10^7 \Omega$.

Component C2:
Polyetheramide block copolymer (PEBA) consisting to an extent of 50% by weight, based on the PEBA, of polyethylene glycol blocks and to an extent of 50% by weight, based on the PEBA, of nylon-12 blocks. This is the polyetheramide block copolymer used in accordance with the invention as component C in WO 2012/084848 A1, C2 has a specific surface resistance (measured according to IEC 60093 in the 1993 version) of $3 \cdot 10^9 \Omega$.

Component D1:
Tinuvin™ 360 (BASF, Ludwigshafen, Germany):
2,2'-methylenebis[6-(2H-benzotriazol-2-yl)-4-(1,1,3,3-tetramethylbutyl)phenol]

Component D2:
Tinuvin™ 1600 (BASF, Ludwigshafen, Germany):

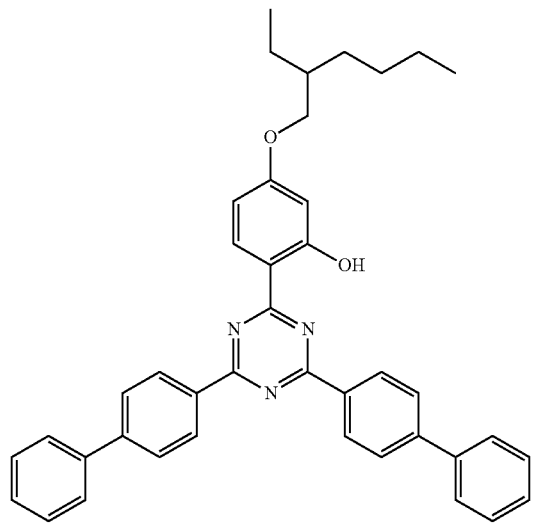 [SMILES: CCCCC(CC)COc1ccc(-c2nc(-c3ccc(-c4ccccc4)cc3)nc(-c3ccc(-c4ccccc4)cc3)n2)c(O)c1]

Component D3:
Tinuvin™ 329 (BASF, Ludwigshafen, Germany):
2-(2H-benzotriazol-2-yl)-4-(1,1,3,3-tetramethylbutyl)phenol Component E1:
Titanium dioxide pigment: Kronos™ 2233 (Kronos Titan GmbH, Leverkusen, Germany)

Component E2:
Rutile pigment: Heucodur™ Yellow 3R (Heubach GmbH, Langelsheim, Germany)

Component E3:
Iron oxide pigment: Bayferrox™ 180M (Lanxess AG, Cologne, Germany)

Component E4:
Carbon black: Elftex™ 570 Pearls (Cabot GmbH, Rheinfelden, Germany)

Component E5:
pentaerythritol tetrastearate

Component E6:
Irgafos™ 168 (BASF; Ludwigshafen, Germany)
tris(2,4-di-tert-butylphenyl) phosphite Component E7:
Irganox™ 1076 (BASF; Ludwigshafen, Germany):
2,6-di-tert-butyl-4-(octadecanoxycarbonylethyl)phenol Production and Testing of the Moulding Compositions According to the Invention The components were mixed in a Werner & Pfleiderer ZSK-25 twin-screw extruder at a melt temperature of 260° C. and with application of a reduced pressure of 50 mbar (absolute). With the exception of the test specimens for the puncture test, the moulded articles were produced at a melt temperature of 260° C. and a mould temperature of 80° C. in an Arburg 270E injection moulding machine. The test specimens for the puncture test were produced at a melt temperature of 300° C. with otherwise identical processing parameters.

The melt volume flow rate (MVR) was determined according to LSO 1133 (2012 version) at 280° C. with a rain load of 5 kg after a dwell time of 5 minutes.

A measure used for the thermal processing stability of the composition was the relative change in the MVR (delta-MVR) measured according to ISO 1133 (2012 version) at 280° C. with a ram load of 5 kg after a dwell time of 15 minutes compared to the dwell time of 5 minutes.

IZOD notched impact strength was determined at −30° C. according to ISO 180-1A (1982 version) on each of ten test specimens measuring 80 mm×10 mm×4 mm. Individual notched impact strength values >30 kJ/m$^2$ were classified as tough fracture behaviour.

The tough/brittle transition temperature in the IZOD notched impact test was defined as that temperature at which about half the test specimens have tough and about half have brittle fracture behaviour according to the definition above.

Vicat B/120 as a measure of heat distortion resistance was determined according to ISO 306 (2013 version) on test specimens having dimensions of 80 min×10 mm×4 mm with a ram load of 50 N and a heating rate of 120°C./h.

A measure used for low-temperature ductility in the impact/crash test, which is of practical relevance, was the behaviour in the multiaxial puncture test. The puncture test was conducted at −30° C. based on ISO 6603-2 (2000 version, "based on" means that no visual check of the test specimens was conducted) on test specimens of dimensions 60 mm×60 mm×2 mm. These were fabricated at an elevated melt temperature of 300° C. in order to simulate particularly critical processing conditions. The modes of fracture of a total of ten test specimens were evaluated to determine whether a tough (non-shattering) or brittle (shattering) mode of fracture occurs.

Specific surface resistance was determined according to 1EC 60093 (1993 version) on round sheets having a diameter of 60 mm and a thickness of 2 mm.

Light stability was assessed in the heat and light weathering test according to VW standard PV1303 (2001 version). After 3 and after 6 weathering cycles, a greyscale determination was conducted on colour sample plaques of dimensions 60 mm×40 mm×2 mm relative to the starting state prior to exposure.

TABLE 1

Compositions and properties thereof

| Components [parts by weight] | 1 | 2 | 3 | CE4 | CE5 | CE6 | CE7 | CE8 |
|---|---|---|---|---|---|---|---|---|
| A | 70 | 70 | 70 | 70 | 70 | 70 | 70 | 70 |
| B1 | 23 | 23 | 23 | 23 | 23 | 23 | | |
| B2 | | | | | | | 23 | |
| B3 | | | | | | | | 23 |
| C1 | 7 | 7 | 7 | | | | 7 | 7 |
| C2 | | | | 7 | 7 | 10 | | |
| D1 | 0.25 | | | | | | | |
| D2 | | 0.25 | | | 0.25 | | 0.25 | |
| D3 | | | 0.25 | 0.25 | | 0.25 | | |
| E1 | 4.77 | 4.77 | 4.77 | 4.77 | 4.77 | 4.77 | 4.77 | 4.77 |
| E2 | 0.28 | 0.28 | 0.28 | 0.28 | 0.28 | 0.28 | 0.28 | 0.28 |
| E3 | 0.05 | 0.05 | 0.05 | 0.05 | 0.05 | 0.05 | 0.05 | 0.05 |
| E4 | 0.03 | 0.03 | 0.03 | 0 03 | 0.03 | 0.03 | 0.03 | 0.03 |
| E5 | 0.75 | 0.75 | 0.75 | 0.75 | 0.75 | 0.75 | 0.75 | 0.75 |
| E6 | 0.08 | 0.08 | 0.08 | 0.08 | 0.08 | 0.08 | 0.08 | 0.08 |
| E7 | 0.22 | 0.22 | 0.22 | 0.22 | 0.22 | 0.22 | 0.22 | 0.22 |
| Properties | | | | | | | | |
| Notched impact strength (−30° C.) [kJ/m$^2$] | 55 | 55 | 54 | 57 | 58 | 34 | 15 | 15 |
| % ductile fracture behaviour in puncture test (−30° C.) | 100 | 100 | 100 | 90 | 100 | 100 | 0 | 0 |
| Tough/brittle transition temperature in IZOD notched impact test [° C.] | −35 | −35 | −35 | −35 | −35 | −30 | −5 | +/−0 |
| Vicat B/120 [° C.] | 129 | 130 | 129 | 128 | 128 | 128 | 128 | 125 |
| MVR(280° C./5 kg/5 min) [ml/10 min] | 34 | 34 | 35 | | | | | |
| MVR(280° C./5 kg/15 min) [ml/10 min] | 51 | 49 | 58 | | | | | |
| Delta MVR (5 min → 15 min) [%] | 50% | 44% | 66% | | | | | |
| Surface resistance [Ω] | $7 \cdot 10^{11}$ | $6 \cdot 10^{11}$ | $1 \cdot 10^{12}$ | $6 \cdot 10^{12}$ | $5 \cdot 10^{12}$ | $1 \cdot 10^{12}$ | $4 \cdot 10^{11}$ | $8 \cdot 10^{11}$ |
| Greyscale after 3 cycles | 4 | 4 | 4 | 4 | 4 | 4 | 4 | 5 |
| Grey scale after 6 cycles | 4 | 5 | 4 | 3 | 3 | 3 | 4 | 4 |

The data in Table 1 show that the inventive compositions 1-3, compared to the comparative examples of compositions 4-8, have an improved combination of excellent low-temperature ductility in the notched impact test and the puncture test, dissipative electrical conductivity (i.e. reduced electrical surface resistance) and exposure stability in the heat and light ageing test.

Furthermore, a comparison of inventive compositions 1 and 2 with the likewise inventive composition 3 shows that the use of UV stabilizers from the group consisting of the substance classes of the dimeric benzotriazoles and the 1,3,5-triazines should lead to further advantages in terms of processing stability, and these specific UV stabilizers should therefore preferably be used with regard to this achievement of an optimized profile of properties.

Comparative Examples 4 and 5, in which a noninventive antistat according to the prior art is used, have poorer dissipative electrical conductivity and poorer stability to light exposure, if the antistat according to the prior art is used in a higher concentration (Comparative Example 6), the result is an improved dissipative electrical conductivity, but at the cost of low-temperature ductility. However, no improvement in the dissipative electrical conductivity to the level which is achieved with the compositions according to the invention is achieved by such an increase in concentration.

Comparative Examples 7 and 8 again show that good dissipative electrical conductivity and stability to light exposure can likewise be achieved using the antistat according to the invention with ABS and ASA vinyl copolymers according to the prior art, but this does not result in the combination with high ductility at low temperatures.

The invention claimed is:

1. Compositions comprising
   A) 50% to 90% by weight of at least one polymer selected from the group consisting of aromatic polycarbonate, aromatic polyestercarbonate and aromatic polyester,
   B) 5% to 40% by weight of at least one polymer containing
      B.1 at least one rubber-modified vinyl (co)polymer containing
         B.1.1 80% to 95% by weight, based on the total weight of B.1, of at least one vinyl monomer and
         B.1.2 5% to 20% by weight, based on the total weight of B.1, of one or more elastomeric polybutadiene-containing graft bases,
      where B.1 contains
         polybutadiene-containing rubber particles which have been grafted with the vinyl monomers B.1.1 and contain vinyl (co)polymer consisting of the vinyl monomers B.1.1 embedded within the rubber particles and cannot be leached out by means of standard solvents, and
         a vinyl (co)polymer matrix consisting of the vinyl monomers B.1.1 which is not bound to these rubber particles and is not included in rubber particles,
   and optionally B.2 further rubber particles grafted with vinyl monomers and composed of
      B.2.1 5% to 75% by weight, based on the total weight of B.2, of at least one vinyl monomer and
      B.2.2 25% to 95% by weight, based on the total weight of B.2, of one or more elastomeric graft bases,
   C) 3% to 25% by weight of a mixture comprising a) at least one polyether-based polymer or copolymer selected from the group consisting of polyether block polymers and polyether-based polyurethanes and b) at least one boron-containing salt,
   D) 0% to 2% by weight of at least one UV stabilizer selected from the group consisting of the substance classes of the benzotriazoles and triazines,
   E) 0% to 20% by weight of one or more further additives, wherein the compositions comprising components A) to E) have a polybutadiene content of 1% to 5% by weight.

2. Compositions according to claim 1, wherein component A is aromatic polycarbonate.

3. Compositions according to claim 1, wherein component B.1 is produced in bulk polymerization methods and the rubber particles containing vinyl (co)polymer inclusions in component B.1 have a median particle diameter D50 of 0.5 to 1.5 μm.

4. Compositions according to claim 1, wherein component B.1 has a polybutadiene content of 8% to 13% by weight.

5. Compositions according to claim 1, wherein the vinyl (co)polymer of component B that is not bound to rubber particles and not included in rubber particles has a weight-average molecular weight of 140 to 200 kg/mol.

6. Compositions according to claim 1, wherein component B.2 has been produced in emulsion polymerization by grafting of
   B.2.1 25% to 50% by weight, based on the graft polymer B.2, of at least one vinyl monomer and
   B.2.2 50% to 75% by weight, based on the graft polymer B.2, of one or more elastomeric graft bases with glass transition temperatures of <−70° C. and with median particle sizes D50 of 0.2 to 0.4 μm.

7. Compositions according to claim 1, wherein the compositions are free of polyacrylate rubbers and silicone rubbers and of graft polymers that contain polyacrylate rubbers and silicone rubbers as graft base.

8. Compositions according to claim 1, wherein the proportion of component B.1 in B is at least 70% by weight, based on the total weight of component B.

9. Compositions according to claim 1, wherein the polyether-based polymer from component C) is a polyetheramide block copolymer consisting of 30% to 70% by weight, based on the block copolymer, of polyethylene glycol blocks and to an extent of 30% to 70% by weight, based on the total weight of the block copolymer, of polyamide.

10. Compositions according to claim 1, wherein the boron-containing salt in component C is at least one alkali metal salt of a boron-centred anionic complex containing bidentate ligands selected from the group consisting of C2-C8 aliphatic or aromatic components having at least two reactive groups selected from —COOH and —OH.

11. Compositions according to claim 9, wherein the boron-containing salt is potassium bis(oxalato)borate or sodium bis(oxalato)borate.

12. Compositions according to claim 1, wherein component C consists of
   69.6% to 98.6% by weight of polyether block polymer consisting to an extent of 30% to 70% by weight, based on the total weight of the polyether block polymer, of polyethylene glycol blocks and to an extent of 70% to 30% by weight, based on the total weight of the polyether block polymer, of nylon-12 blocks,
   1% to 30% by weight of at least one further polymer selected from the group consisting of poly(meth)acrylates and polymethyl(meth)acrylates and
   0.4% to 4.0% by weight of at least one representative selected from the group consisting of potassium bis (oxalato)borate and sodium bis(oxalato)borate.

13. Compositions according to claim 1, wherein component D is selected from the group consisting of the substance classes of the dimeric benzotriazoles and the 1,3,5-triazines.

14. A method comprising utilizing the compositions according to claim 1 for production of moulded articles.

15. Moulded articles obtainable from compositions according to claim 1.

16. Compositions according to claim 1, wherein the proportion of component B.1 in B is at least 95% by weight, based on the total weight of component B.

17. Compositions according to claim 1, wherein the vinyl (co)polymer of component B that is not bound to rubber particles and not included in rubber particles has a weight-average molecular weight of 150 to 180 kg/mol.

18. Compositions according to claim 1, wherein component D is 0.1% to 1.0% by weight.

19. Compositions according to claim 18, wherein component D is selected from the group consisting of the substance classes of the dimeric benzotriazoles and the 1,3,5-triazines.

20. A composition comprising
- A) 60% to 80% by weight of an aromatic polycarbonate having a molecular weight of from 24000 to 32000 g/mol;
- B) 10% to 30% by weight of at least one polymer containing
  - B.1 at least one rubber-modified vinyl (co)polymer containing
    - B.1.1 80% to 95% by weight, based on the total weight of B.1, of at least one vinyl monomer and
    - B.1.2 5% to 20% by weight, based on the total weight of B.1, of one or more elastomeric polybutadiene-containing graft bases,
  - where B.1 contains
    - polybutadiene-containing rubber particles which have been grafted with the vinyl monomers B.1.1 and contain vinyl (co)polymer consisting of the vinyl monomers B.1.1 embedded within the rubber particles and cannot be leached out by means of standard solvents, and
    - a vinyl (co)polymer matrix consisting of the vinyl monomers B.1.1 which is not bound to these rubber particles and is not included in rubber particles,
  - and optionally B.2 further rubber particles grafted with vinyl monomers and composed of
    - B.2.1 5% to 75% by weight, based on the total weight of B.2, of at least one vinyl monomer and
    - B.2.2 25% to 95% by weight, based on the total weight of B.2, of one or more elastomeric graft bases,
- C) 5% to 15% by weight of a mixture comprising a) at least one polyether-based polymer or copolymer selected from the group consisting of polyether block polymers and polyether-based polyurethanes and b) at least one boron-containing salt,
- D) 0% to 2% by weight of at least one UV stabilizer selected from the group consisting of the substance classes of the benzotriazoles and triazines,
- E) 0.1% to 10% by weight of one or more further additives,
- wherein the compositions comprising components A) to E) have a polybutadiene content of 1% to 5% by weight, and wherein component B.1 has a polybutadiene content of 8% to 13% by weight.

21. A compositions according to claim 20, wherein component D is selected from the group consisting of dimeric benzotriazoles and 1,3,5-triazines, and is 0.1% to 1.0% by weight.

* * * * *